Figure 1:
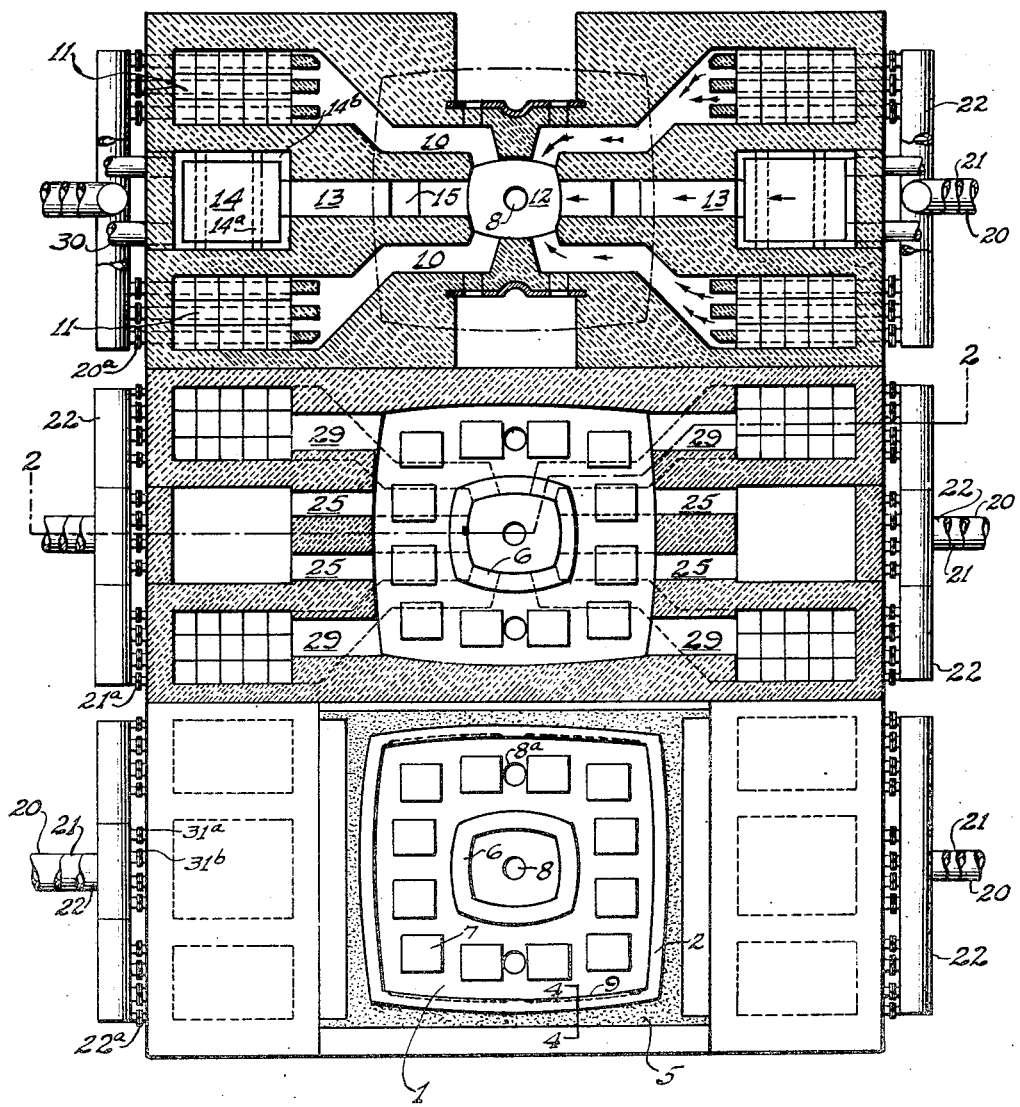

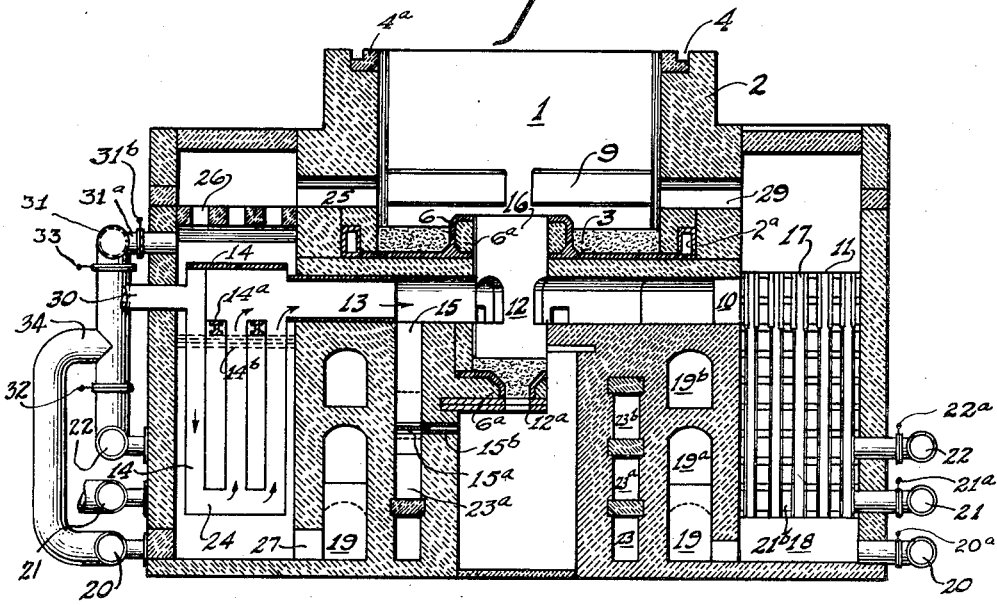
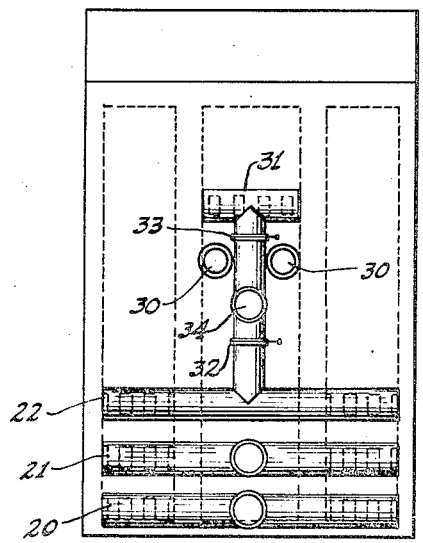
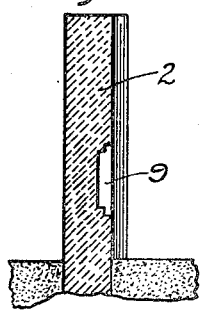

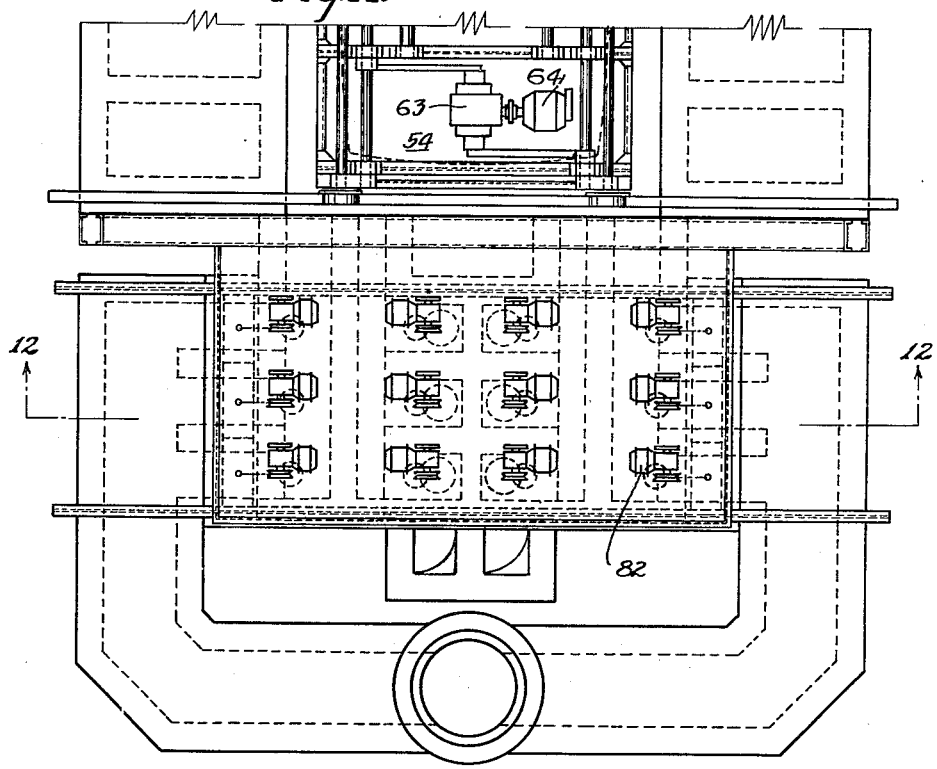
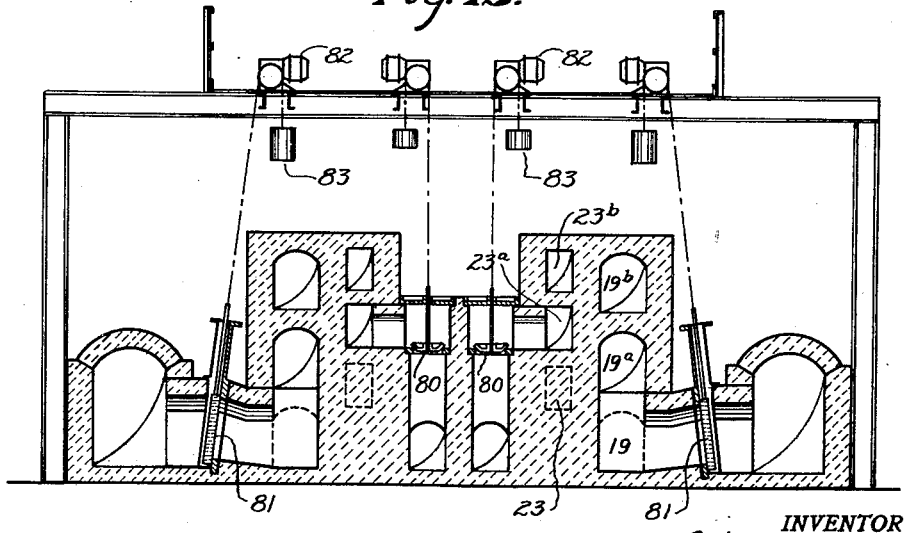

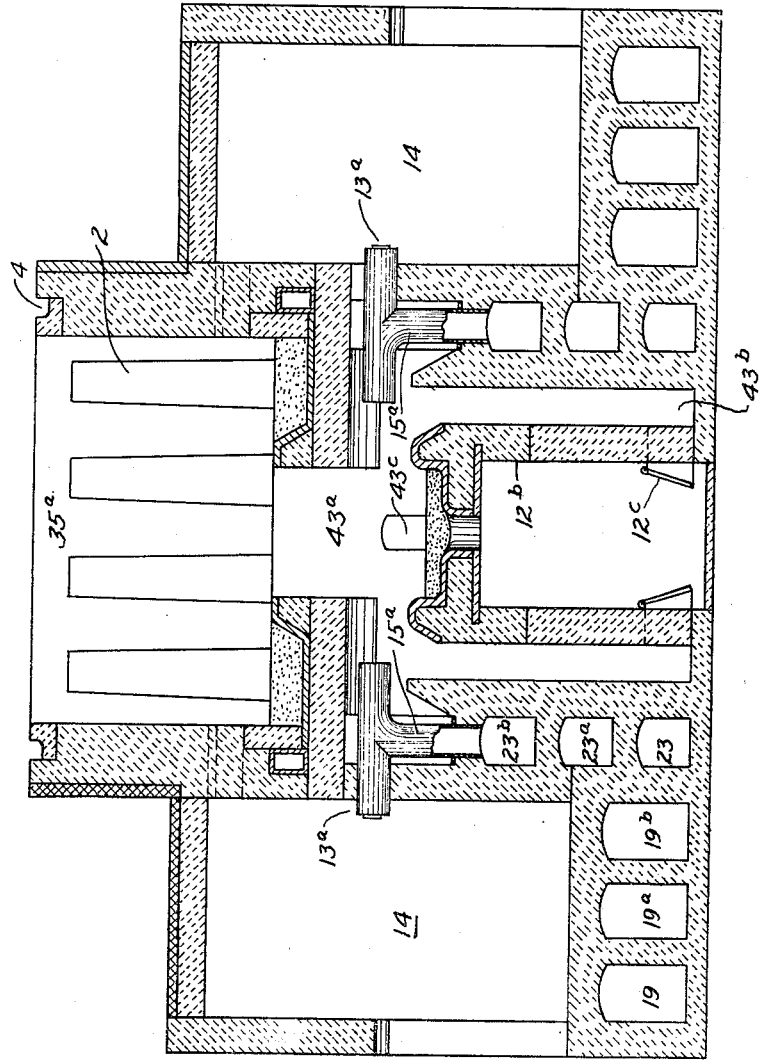

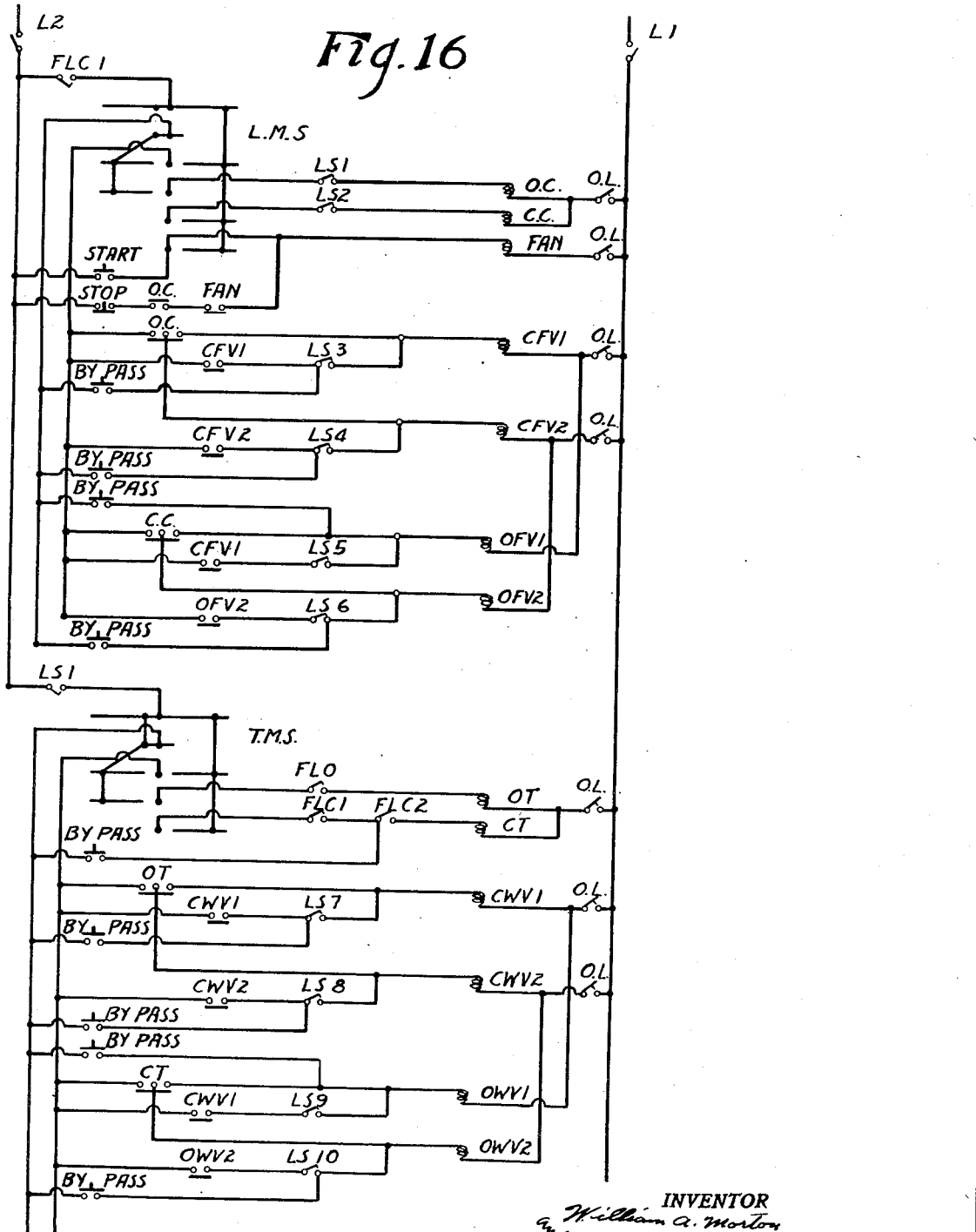

Patented July 26, 1938

2,124,888

UNITED STATES PATENT OFFICE 2,124,888

RECUPERATIVE SOAKING PIT FURNACE

William A. Morton, Mount Lebanon, and Howard F. Spencer, Pittsburgh, Pa., assignors to Amco, Incorporated, Pittsburgh, Pa., a corporation of Pennsylvania Application July 5, 1934, Serial No. 733,812

21 Claims. (Cl. 263—15)

This invention relates to pit furnaces of the recuperative type for the heating of ingots or the like, and the present application is a continuation in part of an application filed February 14, 1934, serially numbered 711,166.

In the aforementioned application is described a recuperative type pit furnace in which a gaseous heating medium is directed vertically into the heating or combustion chamber and the products of combustion withdrawn from said chamber at or near the bottom thereof.

It is among the objects of the present invention to provide an improved arched furnace wall structure for deep pits which shall be adapted to resist displacement due to shrinkage or thermal expansion caused by the heat differential between the interior and exterior surfaces of the walls.

Another object of the invention is the provision of a sealed cover for the pit and means responsive to the cover movements for controlling the fuel supply and waste gas exit to and from the furnace chamber, the cover being movable over the furnace opening in a manner to expose only the portion of the combustion chamber into which or from which ingots are to be moved, thereby minimizing the loss of heat.

A further object of the invention is the provision of an improved mixing chamber for pre-mixing the fuel and preheated air into combustible gases, and still a further and primary object of the invention is the provision of means for controlling the flame characteristics of the combustible gases in the combustion chamber by controlling the preheat of the air and by preheating the gaseous fuel preliminary to its admission to the mixing chamber.

Still another object of the invention is the provision of a recuperator tile structure with gas and air passages in heat exchange relation for the preheating of air, which shall be adapted to maintain proper thermal balance of the recuperator tile to prevent leakage and breakage thereof, and which shall be adapted to lower the temperature of a portion of the waste gases passing through the tile structure preliminary to the utilization of such reduced temperature waste gases in a metal recuperator structure for preheating certain gaseous fuels.

Still a further object of the invention is the utilization of a portion of the waste gases for diluting the fuel gases to obtain a luminous flame where rich fuels such as oil, natural gas, or coke oven gas is employed, and which shall be adapted to operate without such dilution where a lean gas such as producer gas or blast furnace gas is employed.

Generally it is the object of the invention to provide a recuperative industrial heating furnace which is adapted for the use of rich and lean fuels and which, by means of regulable control means, provides great flexibility in the regulation of combustion and flame characteristics from a variety of fuels.

Figure 5:
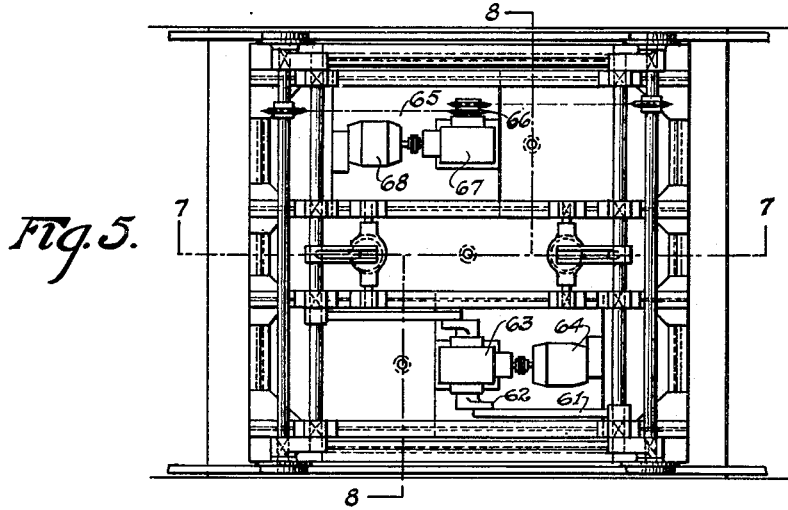
Figure 6:
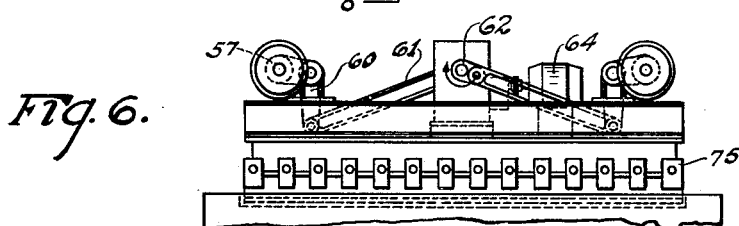
Figure 7:
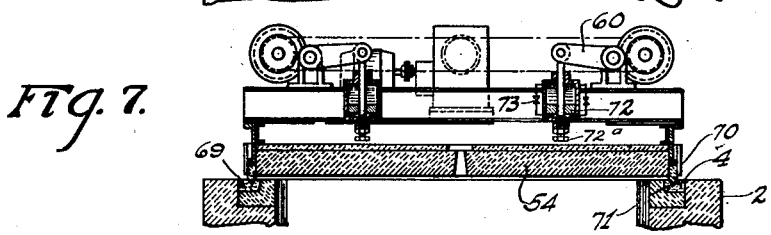
Figure 8:
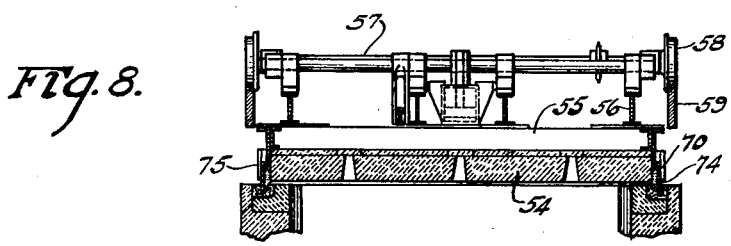
Figure 9:
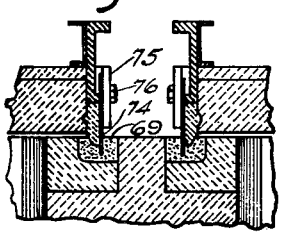
Figure 10:
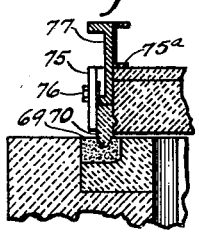
Figure 13:
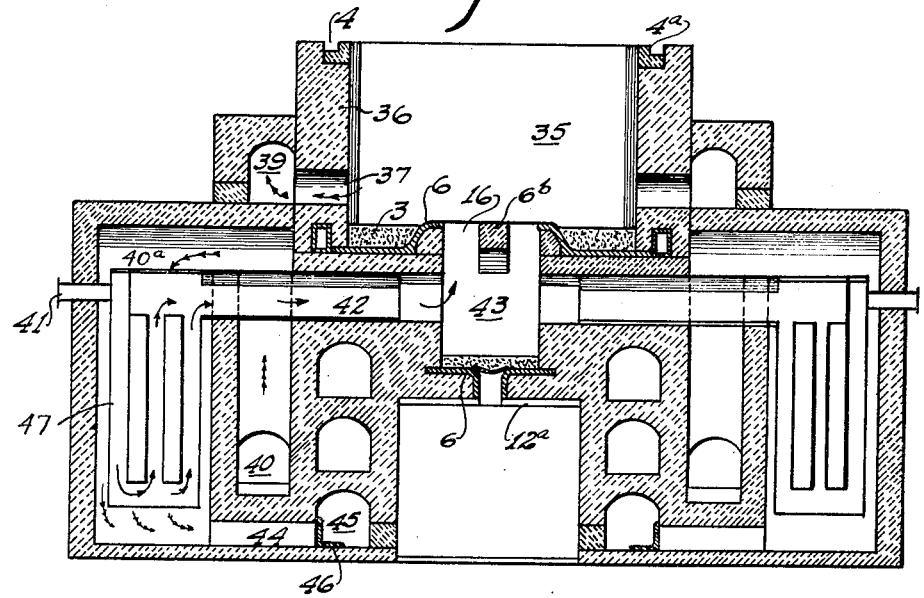
Figure 14:
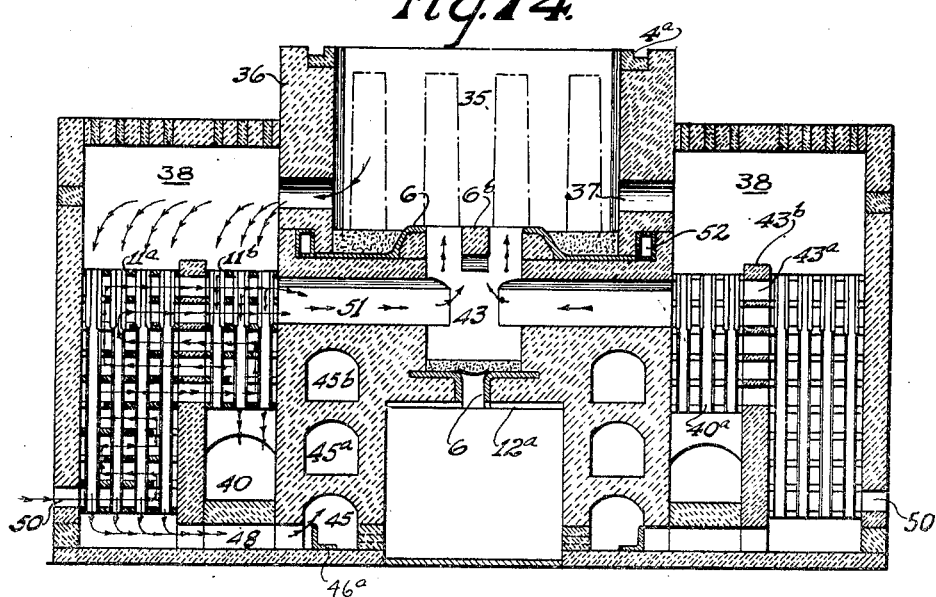

These and other objects of the invention will become more apparent from a consideration of the accompanying drawings constituting a part hereof in which like reference characters designate like parts and in which:

Figure 1 is a top plan view partially in cross-section of a pit type recuperative furnace embodying the principles of this invention;

Figure 2 a vertical cross-sectional view taken along the line 2—2, Figure 1;

Figure 3 a side elevation of the exhaust and air manifolds of the recuperator structures;

Figure 4 a vertical cross-section of a portion of the pit wall taken along the line 4—4, bottom of Figure 1;

Figure 5 a top plan view of a cover and cover operating mechanism of the pit;

Figure 6 a front elevational view thereof;

Figure 7 a sectional elevational view taken along the line 7—7, Figure 5;

Figure 8 a sectional elevation taken along the line 8—8, Figure 5;

Figure 9 a cross-sectional view of a fragmentary portion of the cover and roof illustrating a granular yielding seal;

Figure 10 a similar view of a cover edge seal in accordance with Figure 7 of the drawings;

Figure 11 a plan view of the rear half of the furnace illustrating valve operating mechanism for the fuel, air and waste gas passages;

Figure 12 a cross section taken on the line 12—12, Figure 11;

Figure 13 a vertical cross-sectional view of a pit type furnace showing a metallic recuperator for preheating blast furnace fuel gases;

Figure 14 a vertical cross-section illustrating a modified form of air recuperator used in conjunction with the gas preheater of Figure 13;

Figure 15 a vertical cross-section of a modified form of pit type furnace; and

Figure 16 a diagrammatic view of a control system for the cover and valve operating motors.

With reference to Figures 1 to 4 inclusive of the drawings, the structure therein illustrated comprises a combustion chamber designated by the reference numeral 1 constituted of heavy heat insulating side walls 2, and a hearth 3 of coke breeze material, the top of wall 2 being provided with a groove 4 formed by the block 4a for receiving a granular refractory such as flint sand 5 shown in Figures 1, 9 and 10.

The hearth structure consists of a monolithic refractory member 6 projecting into the combustion chamber, on which is supported the renewable hearth material 3, chamber 1 being preferably shaped as shown in the lower portion of Fig. 1 with the refractory 6 forming a cover for curb wall 6a inside chamber 1. The walls 2 are preferably of arcuate shape, as shown at the bottom of Fig. 1 to resist motion from expansion and contraction forces due to the temperature differential between the interior and exterior surfaces of the walls, any tendency for contraction being resisted because of this arched form. The space between the partition wall 6 of the firing port and the outer wall 2 of the pit is occupied by ingots designated by reference numeral 7, the ingots themselves acting as walls in the combustion chamber. Cooling passages 2a are provided beneath the walls 2 to prevent sagging of the refractories due to the weight of the walls.

To secure increased circulation of the products of combustion remote from the center of the combustion chamber, the outer walls are recessed or grooved at 9, as shown in Figure 4, to reduce the resistance to flow of the gases behind the ingots thereby increasing circulation between the ingots and the walls.

With reference to the upper portion of Fig. 1, the numeral 10 designates preheated air passages leading from a recuperator tile structure 11 to a fuel mixing chamber 12. The numeral 13 designates a gas passage leading from a gas tight metal recuperator structure 14 and the passage 15 designates a fuel passage for producer gas which may optionally enter the gas stream from the gas recuperator passage 13, to create a mixed gas of higher B. t. u. value and then mixes with the preheated air from the recuperator passages 10 to produce a highly combustible mixture in the chamber 12 from which it passes upwardly through the firing port 16. Openings 8 and 8a, bottom Figure 1, are drain openings in the hearth and mixing chamber respectively for the removal of slag or the like.

The plan view of Figure 1 shows a 3-hole soaking pit, each hole being provided with two air preheaters 11 and one blast furnace gas preheater 14 on opposite sides. The gas preheater is used only with blast furnace gas fuel. The air preheaters are constantly used regardless of the fuel employed. Manifolds 20, 21 and 22 control the waste gas, and air to the pits through the several air preheaters, each pit having separate control and having in addition separate fuel, and air, and exhaust gas control from each side to balance radiation losses, compensate for leakage in the related exchanger, and regulate other factors which tend to interfere with control.

The air and gas recuperator structures are more clearly shown in Figs. 2 and 3 of the drawings, an air recuperator 11 is shown on the right hand side of the figure and a gas recuperator 14 on the left hand side. The recuperator for preheating air consists of a checkerwork of tile having vertical waste gas passages 17 leading to a bottom collecting chamber 18 from which waste gases pass to a chimney flue 19 or through the exhaust manifold 20. Horizontal air passages 21b in heat exchange relation with the vertical waste gas passages, communicate with an air intake manifold 21 at the bottom, and the preheated air outlet passages 10 at the top of the tile structure.

It is to be noted that there are three stack passages 19, 19a and 19b, leading to the three units of the structure shown in Fig. 1 to provide individual draft or exhaust regulation. Similarly, there are three producer gas passages 23, 23a and 23b, leading to the ports 15 of the gas passages 13, and there are two gas preheaters and four air recuperators for each pit furnace.

The gas recuperator 14 is constructed of metal conduits 24 preferably of non-corroding alloys, and in the structure shown in Figure 2 the waste gases leaving the combustion chamber through passages 25 pass downwardly through the openings 26 into the gas recuperator chamber surrounding the metal recuperator and then pass through the stack opening 27 to the exhaust stack 28. The tile recuperators are also connected to the combustion chambers by waste gas passages 29 from which the products of combustion are withdrawn and passed through the vertical tile passages 17 in a downward direction. The manifold structures 20, 21 and 22 adjacent the metal recuperator 14, are the manifolds for the air and gas recuperators, dampers 20a, 21a and 22a being provided to control the flow of air or gases therein.

The gases to be preheated in the recuperator 14 enter a valved passage 30, pass downwardly and upwardly through the recuperator passages as shown by arrows, and then through the passage 13 into the mixing chamber 12. To reduce the temperature of the waste gases entering recuperators 14 by passages 26, provision is made to mix the cooled gases after they pass through the air recuperators, with the hot gases entering through openings 26 by means of the following apparatus:—A manifold 31, Figure 3, is provided on the sides of the gas recuperators 14 and damper controlled passages 31a lead to the space above the metal recuperators. The manifold 31 connects with the manifold 20 of the air recuperator exhaust by passages 34, dampers 32 and 33 being provided to control the passage of waste gases to either passage 31a or manifold 22.

The object of recirculating the waste gases which are withdrawn from the tile recuperators 11 at about 600° F. and returned to the top of gas preheaters 14 is to mix same with the waste gases leaving the combustion chamber 1 through flues 25 at a temperature of about 2400° F. and reduce the temperature in chamber 14 to within the refractory limit of the alloy metal recuperator which is designed to heat the blast furnace gas to about 1000° F.

In Figs. 13 and 14 a method of accomplishing this result without an exhauster is shown. In the latter construction, Figure 13, the numeral 35 designates a combustion chamber; 36, the walls of arcuate shape as shown in Fig. 1; 37, the exhaust or waste gas passage leading directly to an air recuperator chamber 38 through passage 39. The gaseous fuel to be preheated enters the passage 41 and passes downwardly and upwardly as designated by arrows, through a metal recuperator 47 from which it is directed through the horizontal passage 42 to the mixing chamber 43 which corresponds to chamber 12 in Fig. 2.

Figure 14 shows a cross-section through the recuperator tile of the furnace of Fig. 13 in which numeral 38 designates the waste gas collecting chamber at the top of the tile; 48, the exhaust passage at the bottom of the chamber; 46, an additional exhaust passage below a portion of the recuperator tile, passage 48 leading to stack 45 controlled by a damper 46 and the passage 40 leads to a chamber 40a above the metallic gas recuperator 47. Air inlet passages 50 are provided at the bottom of the recuperator tile structure which is further provided with communicating horizontal passages for the passage of air in an upward direction as indicated by double arrows, the preheated air passage into horizontal passage 51 leading to the mixing chamber 43. Cooling passages 52 are provided below the pit furnace wall, cold air or other cooling medium being forced therethrough.

For a clear understanding of the direction of flow of air, fuel gas, waste gas and combustion gases, single arrows designate the fuel gas, double arrows the preheated air, three arrows the combustion gases resulting from a mixture of the fuel gas and preheated air, and four arrows designate the products of combustion or waste gases leaving the combustion chamber.

In the modified construction shown in Figure 15 the fuel mixing chamber 43a is open at the top to the combustion chamber 35a and has a slag pocket 43b around its bottom wall 12b. Clean out doors 12c are provided to take out slag accumulating in the pocket 43b. The mixing chamber 43a is of such depth that if an ingot were accidentally placed in it, the top of the ingot would extend into the combustion chamber and be accessible for the hoist hooks.

The structure of Figure 15 further differs from Figure 2 in that the waste gas passages 19, 19a and 19b are horizontally disposed below the recuperator chambers instead of vertically, thereby providing space for the slag pocket 43b. The fuel gas passages 23, 23a and 23b are retained in superposed relation. The spaces 14 are for gas preheat recuperator structures as in Fig. 2, through which fuel is delivered to chamber 43a through ducts 13a, or gaseous fuel may be supplied direct through duct 15a. An opening 43c is provided above the hearth of mixing chamber 43a to remove accumulations of slag and the like.

In Figures 5 and 10 inclusive of the drawings are shown a cover for closing and sealing the pit and cover operating mechanism. The cover consists of a refractory material 54, Figure 8, mounted on channels 55 which are suspended by I-beams 56 from a plurality of wheeled axles 57, the wheels 58 of which operate on rails or track 59.

The cover 54 is adapted to be raised and lowered and moved laterally to open the furnace and expose the hearth to charge or remove ingots. The cover is raised on its wheeled support by means of cranks 60 adapted to pivot on the shafts 57, the other ends of crank 60 being connected by links 61 to a crank shaft 62. Shaft 62 is driven through a transmission 63 by a motor 64 which is provided with a magnetic brake 64a. The wheeled axles 57 are driven by sprocket chains 65 engaging sprocket wheels 66 of drive mechanism 67, driven by a motor 68 which is provided with a magnetic brake 68a to move the cover to open and close the furnace.

A cover 54 spans each of the soaking pits and extends over the groove or channel 4 of the side walls 2. The grooves 4 are filled with calcined flint clay, sand, or other granular refractory material 69 and a refractory slab 70 having a V-edge 71 is adapted to project into the sand 69, the inclination of the wedge 71 being greater than the angle of repose of the sealing material 69 so that when the cover is lowered, the sealing material will always effect a seal around the wedge 71.

In lowering the cover, the cranks 60, through the retarding effect of fluid piston mechanism 72 will gradually permit the refractory sealing member 71 to force itself into the granular seal. Valves 73 are provided to control the by-passing of the fluid from either side of the piston, the adjustment being such that the cover may be rapidly lifted and its lowering movement retarded as desired.

In the construction shown in Fig. 8, the metal plates 74 are employed in addition to the refractory slabs 70, the plates extending beyond the wedge 71 of the refractory plates. The refractory members 70 and metal plates 74 are held on cover 54 by clamping shoes 75 which are more clearly shown in Fig. 6 of the drawings. The cross-sectional view of Fig. 10 illustrates the use of refractory wedge-shaped side members 70 on all sides of the cover member, also clearly showing the clamping shoes 75 held by bolts 76 adjacent the yielding face of channel 75a to the channel members 77 of the cover. Fig. 9 illustrates the combined refractory plates and steel plates which are used on the side of the cover, that is the side longitudinal to the direction of movement of the cover when the motor 68 is operated.

With the construction described above, the cover is normally always sealed on all sides. During raising, lowering and traversing to open the pit the two edges, Figure 10, leave the granular seals and are out of contact with same.

The efficient sealing of the furnace is important for saving of fuel and eliminates destruction of the edges of the cover by flames belching from the furnace when it should be normally tight, the construction illustrated being a distinct improvement over existing types The cushioning of the descending cover by the liquid displacement cylinders prevents unnecessary shock to the cover refractories during this movement.

Figures 11 and 12 illustrate motor operated valves controlling the fuel gas, waste gas and preheated air passages. In the section shown in Figure 12, fuel gas passages 23a are controlled by valves 80, and waste gas passages 19 by gates 81. The valves and gates for passages 23, 23b and 19a and 19b are similarly controlled. The valves and gates are individually operated by motors 82 and 82a, respectively, counterweights 83 being provided to substantially balance the weight of the valves and gates.

The motors 82 are controlled to synchronize the valve and gate movements with the movement of the covers 54.

Fig. 16 diagrammatically illustrates the operations of the fuel valve motors 82, combustion air and exhaust fan motor 34b and the exhaust stack gate motors 82a in cooperative relation with the cover hoist motor 64 and cover traverse motor 68.

The opening of the cover is controlled by lift master switch designated LMS which will not set cover lifting motor 64, Figure 5, in operation unless final limit cover switch FLC1 is closed, this switch being closed only when cover is in register with the pit opening. When the cover 54, Figure 7, is raising by contactor coil OC being energized, fuel valves 80, Figure 12, designated CFV1 and CFV2, Figure 16, close and the fan motor on exhaust manifold 20, Figure 2, designated FAN in the diagram of Fig. 16 of the drawings, is shut off. Fuel valve motor coils CFV1 and CFV2 are energized to close valves 80 when coil OC of hoist motor 64 is energized. The coil CWV1 and CWV2 of the stack gate motors 82a remain deenergized for sufficient time to remove the waste gases from the flues and pit. When coil OT of the cover traversing motor 68 is energized, motors 82a are energized to close the waste gas gates 81.

The operator then closes cover traverse master switch TMS to energize traverse motor 68, Figure 5, and waste gas dampers 81, Figure 12, CWV1 and CWV2, Figure 16, close. Cover 54 traverses to expose pit for removal of ingots while fuel valve motor 82 closes the fuel valve 80 and the air fan or blower motor is deenergized to prevent belching from the open pit. At the same time the waste gas gate motor 82a closes gate 81 to prevent atmospheric air entering the pit opening.

When the cover traverses to closing position by energizing contactor coil CT the waste gas dampers 81 open by contactor coils OWV1 and OWV2 being energized, contactor coils CC will then lower cover and OFV1 and OFV2 will open fuel valves and start up the exhaust fan.

The vertical motion cover motor 64 is deenergized by limit switch LS1 the motor being held by a brake 64a in the suspended position of the cover. Overload protection is provided by overload switches OL.

The fuel valve motors 82 are deenergized by limit switches LS3 and LS4, and the fan motor 34b by opening contactor coil CC.

The traversing motor 68 is deenergized by limit switch FLO and this motor brake 68a is energized. The waste gas damper motors are deenergized by limit switches LS7 and LS8. Upon return traversing movement of cover, the motor 68 is deenergized by limit switch FLC1 and spotted over the cover seals by secondary limit switch LS1 which sets the traversing motor brake 68a.

The waste gas damper motors are deenergized by limit switches LS9 and LS10, the cover vertical motion motor 64 is deenergized by limit switch LS2 and the motor brake 64a is released allowing the cover to drop against the resistance of the dash pots 72, Figure 7. The fuel valve motors 82 are deenergized by limit switches LS5 and LS6. The fan motors 34b remain energized. The master switches LMS and TMS are electrically interlocked so that the cover operator can in no way manipulate them to snare the vertical lift or lower motions with the traversing open. The brakes 64a and 68a of the hoist and traverse motors are energized when the power to coils OC CC and OT CT is shut off.

As shown in Fig. 16, the upper half of the diagram illustrates the controls for the hoist motor, the waste gas and combustion air fan and fuel valves, and the lower portion the traverse motor and the stack gates. The controls are of a semi-automatic function in that those pertaining to the hoist motor fan and fuel valves are automatically operative when the master switch LMS is closed to energize the hoist motor, shut off the air supply and exhaust fan motor and close the fuel valve. It then requires a manual setting of switch TMS to initiate the controls which then automatically follow, namely, energizing the traverse motor and operating the stack draft gates.

The operation of the recuperative type of pit furnace described in connection with Figures 1 to 4 of the drawings is as follows: Ingots 7 to be heated are placed on the hearth 3 between the port 6 and wall 2 of the pit as shown in the bottom unit of Figure 1. The cover member of Figures 5 to 10 is mounted on the top of the soaking pit with the edge sealing members fitted into the seal in groove 4 on the top of side walls 2. With the ingot charge in the pit forming a virtual wall for the gases of combustion to heat, preheated air and fuel is conducted through passages 10 and 13 respectively into the mixing chamber 12, wherein a combustible mixture is produced and ignited as it travels through the firing port 16 into combustion chamber 1. The products of combustion envelop the ingots in the chamber 1 passing vertically upward through the center of the chamber and creating very desirable turbulence of the gases in the chamber 1 due to their natural ascensional force, thence around and down the side of the ingots to the waste gas passages 25 leading to the gas recuperators and waste gas passages 29 leading to the air recuperators, it being desired to subject the ingots uniformly to the heat in the chamber 1.

The waste gases pass through the recuperator tile passages 17 either to the stack 19 or to the exhaust manifold 20 depending upon whether damper 20a is opened or closed, and air is impelled into the horizontal passages 21b, Fig. 2, of the tile recuperator from manifold 21 passing upwardly into the passages 10 at the top of the recuperator tile and thence to the mixing chamber 12. The waste gases leaving the passage 25 are drawn through the vertical passages 26 and then around the metal gas recuperator 14, thence through passage 27 to stack 28.

The gas to be heated enters the passage 30 of the metal recuperator 14 and follows the path through the recuperator designated by the single arrow into passage 13, thence to the mixing chamber 12. Fuel gas may also be supplied through the passage 15, but this is optional as either one or both passages 13 and 15 may be employed to supply the fuel gas to the mixing chamber depending upon whether it is desirable or necessary to preheat such gases. When preheated blast furnace gas is used, dampers 15a in frames 15b are used to seal this gas from the raw gas flues 23.

The waste gases leaving the combustion chamber are too hot for the metallic recuperator structure 14 so they are cooled by mixing the cooler waste gases drawn by the exhauster from the tile recuperator 11 from which they are or may be forcibly conducted through the exhaust manifold 20 to the connection 34 of the manifold 31. If damper 33 of the manifold 31 is opened, the lower temperature exhaust gases from the tile recuperator will pass through the damper controlled passage 31a into the space above the metal recuperator wherein they mingle as desired by regulating dampers 31b with the hot gases from the furnace and reduce the temperature sufficiently to be suitable and safe for the metal construction of the gas recuperator.

The manifold 22a is shown connected to the horizontal air passages of the tile recuperator 11, and manifold 22a is likewise shown connected to the manifold 34 of the exhaust line 20. By opening damper 32 of Figures 2 and 3, the waste gases, after leaving the tile recuperator, may be conducted to the inflowing air passages of the tile recuperator through the manifold 22 in desired quantities by regulating dampers 32 and 22a. The exhaust gases from manifold 22 mingle with the preheated air passing through the horizontal recuperator passages into the passages 10 at the top of the recuperator.

The purpose of comingling the exhaust waste gases with the preheated air is to provide the proper flame characteristics to the combustible gases leaving the mixing chamber 12. For example, if a very rich fuel such as natural gas or oil is employed, the addition of the waste gas in the preheated air will produce a long luminous flame desirable for the heating of ingots, whereas if the waste gas were not injected into the combustible mixture, a short and less luminous flame would result. Where lean combustible fuel gases highly saturated with $CO_2$ and nitrogen such as blast furnace gas are employed, waste gases are not injected into the combustible mixture.

By preheating the fuel gas entering through the passage 30 and preheating the air in the recuperator tile structure, a high preheat is obtainable which is desirable especially where leaner fuels are employed. If, for example, blast furnace gas is used and is preheated in the metal recuperator 14, a high preheat is obtainable with a consequent potential rise in temperature within the furnace.

In the modified form of recuperative pit furnace structure shown in Figures 13 and 14, the waste gases withdrawn through passages 37 from the combustion chamber pass into the chambers 38 of the tile recuperator structures, thence downwardly to the vertical passages of the recuperator tile where they become divided, part of the gases passing through a bottom passage 48 to the stack 45, and part of the gases into the passage 40 leading to the upper chamber of the metal recuperator, this chamber being designated 40a in Figure 13. By the construction disclosed, all of the waste gases are drawn through the air recuperator tile, thus assuring a very high preheat as the incoming air through passage 50 follows a relatively long tortuous path to the passage 51 leading to the combustion chamber 43.

The waste gases passing through the short end of the recuperator tile to the passage 40 is sufficiently reduced to heat the metal recuperator 47 without harm, and these gases are directed to the upper chamber 40a from the passage 40 thence downwardly around the metal recuperator structure to the passage 44.

The amount of waste gases drawn through either the long or short section of the recuperator tile is regulable by the use of dampers 46 and 46a, damper 46 controlling the amount drawn through the short air recuperator section and 46a the amount drawn through the long air recuperator passages. By the construction of gas and air recuperator of Figures 11 and 12, maximum preheat of air and gases is obtainable thereby producing maximum heat in the combustion chamber 35.

By offsetting the two recuperator sections, the normal or long portion preheats the air with a controlled normal temperature differential of about 600° F. between the cold air and the waste gas at the base of the recuperator. Blast furnace and raw producer gas have large quantities of inert gases and consequently larger volume of waste gases than are essential to heat the air required to burn them at the required temperatures. Therefore, the surplus waste gas must be by-passed to avoid breaking the tile by setting up undue stresses. However, the air may be superheated in this by-pass section 11b. The last passageway for air through 11a and 11b are of high heat conductive materials. A further object of the short section 11b is to reduce the waste gas temperature to a safe temperature to pass through the metal gas fuel preheater.

To remove ingots from the furnace or charge ingots to the furnace, cover 54 is manipulated as hereinbefore described. Motor 64, when energized, operates crank 60 which lifts the cover on the wheeled axles 57 to clear the wedges 71 of the refractory elements with the top of the walls 2, leaving the metal strip 74 partially in the seal. The motor 68 is then energized and the cover is moved a distance in either direction on its supporting tracks to produce a desired opening for the removal or charging of ingots, and after the ingot is removed or charged, the motor 68 is energized to return the cover to its central position when the motor 64 is again energized to lower the cover. The lowering movement of the heavy cover 54 weighing many tons is retarded by the fluid piston elements 72, and in its lowermost position, the side and end seals 74 and 70 are in the position shown in Figures 9 and 10 of the drawings. Figure 10 shows the ends of covers on adjacent units of a multiple unit furnace as is shown in Figure 1.

By employing the seals on the edges of the cover, the heat is prevented from escaping and high temperatures can be maintained in the heating chambers with a minimum input of fuel. The sealing of the cover also permits uniform heating of the ingots in the pit furnace which again economizes in the use of fuel in that a minimum input is required to bring the metal to the proper working temperature.

It is evident from the foregoing description of the invention that the recuperator arrangement provides for regulation and control of the exhaust of waste gases and the preheating of air and fuel gases in a manner to render the operation of the furnace greatly flexible to meet all operating conditions, and to render it useful for the consumption of various industrial fuels, and by means of the regulable controls of the various exhaust passages, any desired amount of the hot waste gases can be drawn through either the tile recuperator or metal recuperator structures, and through the waste gas passages to the stack. By providing for the injection of the waste gases into the combustible mixture, suitable flame characteristics are obtainable, and by employing wall 6b the perimeter of hearth and firing port is increased whereby more gases are moved by turbulence within the pit, by the aspirating effect of the vertical induction of the combustibles. This is of greatest importance in effecting uniformity of temperature in all parts.

Certain features disclosed in this application are not herein claimed but are claimed in Patent No. 2,079,560 granted May 4, 1937 wherein is claimed certain features of heating ingots; application Serial Number 32,534 filed July 22, 1935 wherein is claimed a furnace cover and cover lifting and traversing mechanism; and application serially numbered 47,254 filed October 29, 1935 wherein is claimed the relationship of the furnace closure and furnace sealing means.

We claim:

1. In an industrial heating furnace, a combustion chamber having inlet and output passages for combustible gases and waste gases respectively, recuperator structures communicating with said passages, means for passing fuel gas through one of said recuperators and air through the other of said recuperators to preheat the same and conduct said fuel gas and air to the inlet passage of the heating chamber, means for drawing the waste gases from the heating chamber through the air recuperator structure, and means for utilizing the exhaust gases withdrawn from the air recuperator to subsequently heat the passages of the gas recuperator.

2. In an industrial heating furnace, a combustion chamber having inlet and outlet passages for combustible gases and waste gases respectively, recuperator structures communicating with said passages, means for passing fuel gas through one of said recuperators and air through the other of said recuperators to preheat the same and conduct said fuel gas and air to the inlet passage of the heating chamber, means for drawing the waste gases from the heating chamber through the air recuperator structure, and connecting means for said air and gas recuperators to conduct the waste gases from the bottom of the air recuperator to the top of the gas recuperator.

3. In an industrial furnace, the combination with a heating chamber of a plurality of recuperators connected to the field inlet and waste gas passages of said chamber, means for drawing a portion of the waste gases through each of said recuperators simultaneously, means for passing air across one of the recuperators and subsequently across another recuperator to heat the air by the entire waste gases, and spaced dampers controlling the movement of waste gases through the recuperators to vary the relative waste gas temperature at the base of the recuperators.

4. In an industrial furnace, the combination with a heating chamber of a plurality of recuperators connected to a fuel inlet and a waste gas passage of said chamber, a divided recuperator chamber having a relatively long recuperator, and a relatively short recuperator tile structure therein with independent exhaust passages for each tile structure, a series of relatively short air preheating passages through the long recuperator for initially heating the air and another series of relatively long air preheating passages extending through both recuperators for final heating of the air.

5. The method of heating air and controlling final waste gas temperatures leaving cooperative recuperators connected to an industrial furnace which comprises passing a stream of air through air passageways around waste gas passageways common to a single recuperator, then passing the stream of air through air passageways common to a plurality of recuperators, and regulating the waste gas moving through each of the recuperators to obtain a desired final temperature of the gases leaving the recuperators.

6. In an industrial furnace, a waste gas collecting chamber, a pair of refractory recuperators having passageways directly connected thereto, means for regulating the amount of waste gases admitted to the passageways of each recuperator to control the final relative temperature of the waste gases leaving the recuperators and air preheating passageways in the recuperators extending through one of the recuperators for a portion of their length and then through both recuperators for another portion of their length.

7. In a steel ingot heating furnace, a heating chamber, a fuel and air mixing chamber at the center and bottom of the furnace, a plurality of exhaust passages angularly spaced in the walls of said heating chamber, a plurality of recuperator structures each connected to one of said exhaust passages and all connected to said mixing chamber, and means for controlling the exhaust of the products of combustion through the several outlet passages of the furnace chamber and through the recuperator structures and to simultaneously vary the preheat of the fuel and air supplied to the mixing chamber to thereby establish regulable heat zones throughout the heating chamber of the furnace.

8. In a steel ingot heating furnace, a heating chamber, a fuel and air mixing chamber communicating with said heating chamber, a plurality of exhaust passages angularly spaced in the walls of said heating chamber, a plurality of recuperator structures each connected to some of said exhaust passages and all connected to said mixing chamber, and means for controlling the exhaust of the products of combustion through the several outlet passages of the furnace chamber, and through the recuperator structures to thereby vary the temperature of the preheat of said recuperators and establish regulable heat zones throughout the heating chamber of the furnace.

9. In a steel ingot heating furnace, a heating chamber having a fuel and air mixing compartment at the bottom thereof and having angularly spaced exhaust passages for the products of combustion in the wall of the chamber, a plurality of recuperator structures having their waste gas passages connected to the exhaust passages of the heating chamber and having their preheat passages connected to the mixing compartment of said chamber, regulable means controlling the volume of the products of combustion leaving the heating chamber through said exhaust passages and delivered to said recuperator structures whereby the degree of preheat of each recuperator and the heat intensity in the region of the exhaust passages are controlled.

10. In an industrial heating furnace, a heating chamber, fuel and air inlet passages communicating with said chamber, waste gas passages in the wall of said chamber, recuperators for preheating gaseous fuel and air entering the heating chamber, the recuperator for preheating the air being connected to the exhaust passages of the heating chamber and the exhaust passages of said last named recuperator being connected to the waste gas passages of the recuperator for preheating the gaseous fuel whereby the hot gases of the heating chamber initially pass through the air recuperator and are subsequently passed in a cooler state through the gaseous fuel recuperators to preheat the gas passing to the heating chamber.

11. In an industrial heating furnace, a heating chamber, a fuel and air mixing chamber communicating therewith, said furnace chamber having an exhaust passage in the wall thereof, a recuperator having long and short waste gas passages communicating with the exhaust passage of said furnace for preheating the air delivered to the mixing chamber, a second recuperator having its waste gas passages communicating with the short passages of said first named recuperator, means for withdrawing all of the products of combustion from the heating chamber of the furnace through the waste gas passages of the first named recuperator and means for passing the waste gases from the short passages of said first named recuperator through the second named recuperator.

12. In a soaking pit furnace for heating ingots, a heating chamber of substantially rectangular shape having arcuate walls joined to form obtuse angles.

13. In a soaking pit furnace for heating ingots, a furnace wall of substantial height forming the soaking chamber said wall being recessed for increasing circulation of the products of combustion between the ingots and the wall surface.

14. In a furnace for heating steel ingots, a combustion chamber having inlet and outlet passages for combustible fuel mixtures and the products of combustion, respectively, a recuperator having waste gas passages communicating with the waste gas outlets of said combustion chamber and having air passages in heat exchange relation with the waste gas passages thereof for supplying preheated air to said combustion chamber, said recuperator having a waste gas exhaust passage and air inlet passages, a by-pass connection for said waste gas and air passages of said recuperator for introducing a portion of the waste gases leaving the recuperator into the air inlet passages, said by-pass connection being independent of said recuperator waste gas outlet and air inlet connections, and means for separately and independently regulating the volume of combustion air and waste gas supplied to the air passages of the recuperator.

15. In a furnace for heating steel ingots, a combustion chamber having inlet and outlet passages for combustible fuel mixtures and the products of combustion, respectively, a plurality of recuperators having waste gas passages communicating with the waste gas outlets of said combustion chamber, one of said recuperators having fuel supply passages in heat exchange relation with the waste gas passage and the other of said recuperators having air passages in heat exchange relation with the waste gas passages for respectively delivering preheated fuel and air to said combustion chamber, a fuel inlet for the first-named recuperator, an air inlet for the second-named recuperator, and exhaust passages for the exhausted waste gases of said recuperators, and means for recirculating a portion of the exhaust waste gases of the second-named recuperator through the waste gas inlet of the first-named recuperator.

16. In a furnace for heating steel ingots, a combustion chamber having inlet and outlet passages for combustible fuel mixtures and the products of combustion, respectively, a plurality of recuperators having waste gas passages communicating with the waste gas outlets of said combustion chamber, one of said recuperators having fuel supply passages in heat exchange relation with the waste gas passage and the other of said recuperators having air passages in heat exchange relation with the waste gas passages for respectively delivering preheated fuel and air to said combustion chamber, a fuel inlet for the first-named recuperator, an air inlet for the second-named recuperator, and exhaust passages for the exhausted waste gases of said recuperators, means for recirculating a portion of the exhaust waste gases of the second-named recuperator through the waste gas inlet of the first-named recuperator, and means for injecting a portion of the exhaust waste gases of the second-named recuperator into the air passages of said recuperator.

17. In a furnace for heating steel ingots, a combustion chamber having inlet and outlet passages for combustible fuel mixtures and the products of combustion, respectively, and having an opening in the top thereof for charging and discharging the furnace chamber, a movable closure for said top opening, means for moving said closure to expose the combustion chamber, means controlling the supply of fuel through the furnace inlet passage, means for controlling withdrawal of the products of combustion from the furnace outlet passages, and means for coordinating said cover moving and furnace inlet and outlet passage controlling means to prevent belching of hot gases from the combustion chamber and drawing of air into said chamber.

18. In a furnace for heating steel ingots, a combustion chamber having inlet and outlet passages for combustible fuel mixtures and the products of combustion, respectively, and having an opening in the top thereof for charging and discharging the furnace chamber, a movable closure for said top opening, motor operated mechanism for actuating said cover in its opening and closing movement relative to the opening in the top of the furnace, motor operated mechanism for controlling the ingress of the fuel mixture and the egress of the products of combustion of the furnace chamber, and a system of control interconnecting the said motor operating mechanisms to render the fuel supply and waste gas controls of the furnace chamber operative in response to the energization of the cover operating mechanism.

19. A vertical type ingot heating pit furnace which includes a hearth, side walls, and a movable closure for the top of the pit, a gaseous burner port in the hearth in the center of the furnace, a recuperator for delivering preheated air to said burner port, valve means regulating the flow of gaseous heat into the pit and other valve means for distributing the flow of waste heat from the pit.

20. A vertical type ingot heating pit furnace which includes a hearth, side walls, and a movable closure for the top of the pit, a gaseous burner port in the hearth at the center of the furnace, a recuperator for delivering preheated air to said burner port, valve means regulating the flow of gaseous heat into the center of the pit and spaced valves controlling the distribution of the waste heat leaving the pit to regulate the heating of the ingots.

21. In an industrial heating furnace comprising a heating chamber, a movable closure for said chamber, fuel inlet and waste gas outlet passages for said chamber, valves controlling said inlet and outlet passages, means for raising and lowering the furnace closure, means for traversing said closure, means responsive to the furnace closure lifting means for rendering the inlet passage control means operative to close said passages and to open said passages when said closure operating means functions to lower said closure, and means responsive to the closure traversing means to render the outlet passage control means operative to close said passage in one direction of the closure movement and to open said passages in the opposite direction of the closure movement.

WILLIAM A. MORTON.
HOWARD F. SPENCER.